2,883,839
Patented Apr. 28, 1959

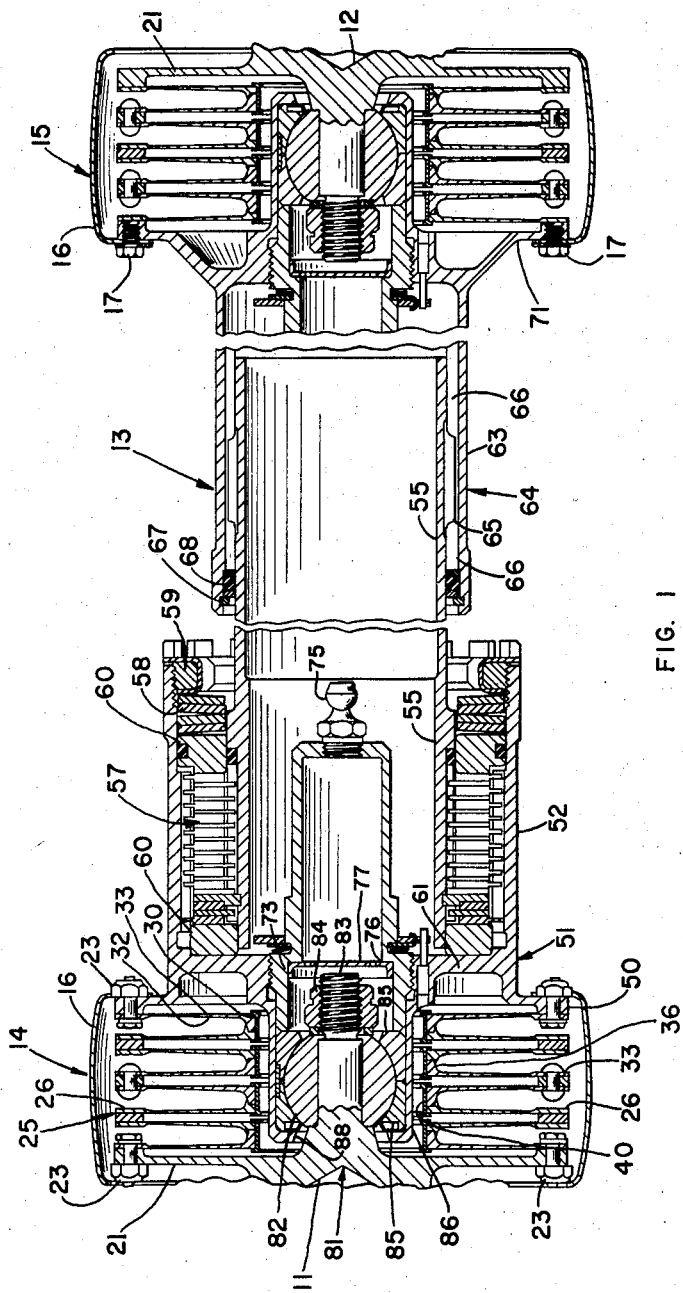

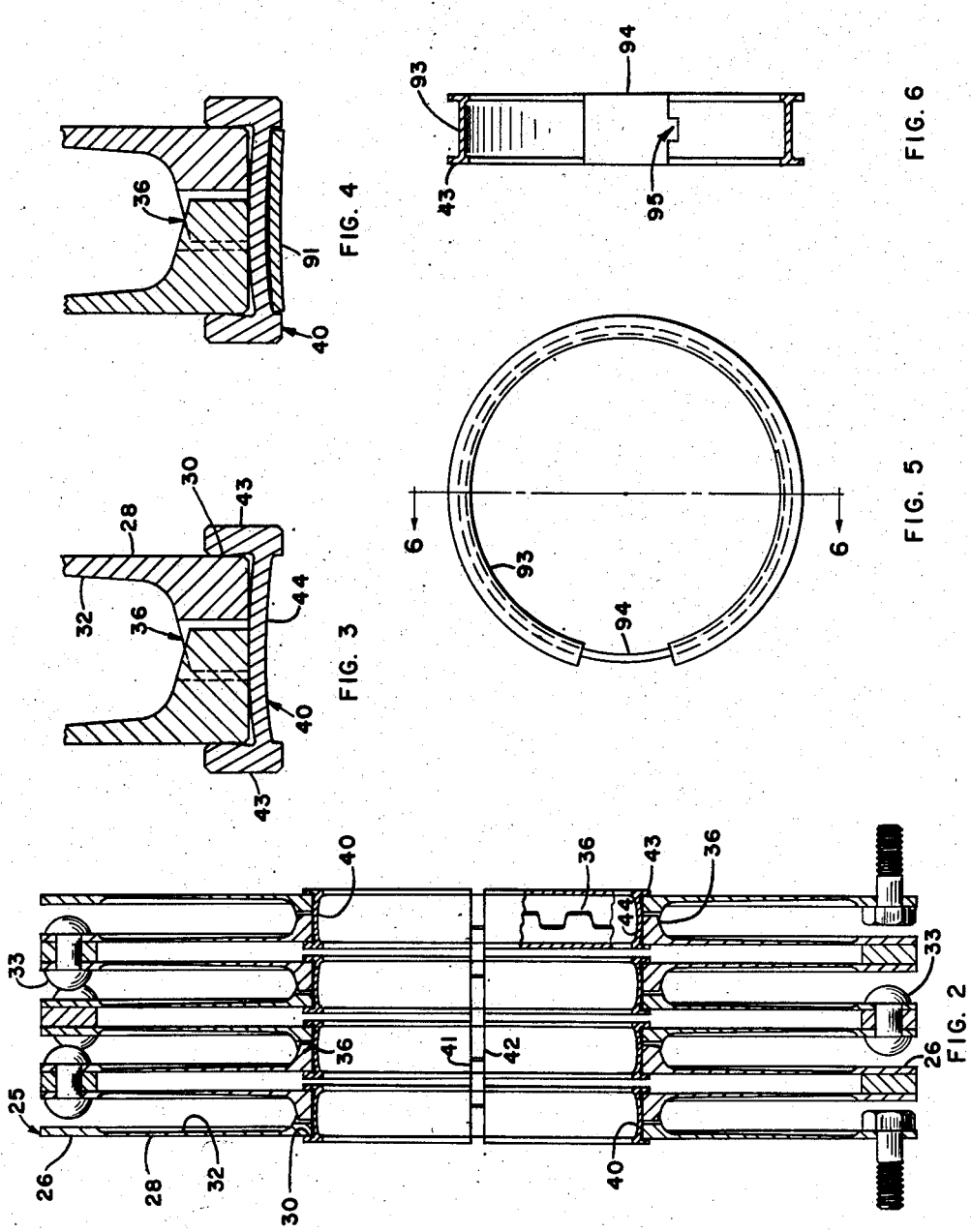

United States Patent Office

2,883,839
FLEXIBLE DRIVE SHAFT

Henry Troeger, Cooperstown, and Cydwel A. Owen, Holland Patent, N.Y., assignors to Bendix Aviation Corporation, Utica, N.Y., a corporation of Delaware Application May 24, 1957, Serial No. 661,333

9 Claims. (Cl. 64—13)

This invention relates to flexible drive shafts and in particular to flexible drive shafts having couplings permitting both angular and axial misalignment.

The purpose of the invention is to provide an improved universal drive shaft to transmit torque between shafts having fixed or varying misalignment at high speeds and subject to vibrations.

It is an object of this invention provide an improved flexible coupling having plurality of series-connected flexible plates for use in coupling two rotatable members having a fixed or varying misalignment.

Another object is to provide an improved universal drive shaft which is particularly suited to the transmission of torque at high speed under misalignment and vibration conditions encountered in aircraft or similar installations.

Another object is to provide an improved flexible coupling having substantially uniform-stressed members which can be manufactured and fabricated at lower cost than prior designs, such as the type which is shown in U.S. Patent No. 2,647,380, issued August 4, 1953, to Troeger and Goldberg.

The accomplishment of the above and other objects, along with the features and advantages of the invention, will be apparent from a consideration of the following description taken in connection with the accompanying drawings wherein embodiments of the invention are illustrated by way of example.

In the drawings:

Figure 1 is a longitudinal cross sectional view of a drive shaft embodying the invention and shows two flexible diaphragm assemblies.

Figure 2 is an enlarged, cross-sectional view of the flexible diaphragm assembly of Fig. 1 and shows a plurality of flexible plates which are clamped together at the inner ends.

Figure 3 is an enlarged, cross-sectional view of the clamping arrangement shown in Fig. 1 and Fig. 2.

Figure 4 is a modification of the Fig. 3 clamping arrangement.

Figure 5 is a side view of an alternate clamping ring.

Figure 6 is a cross-sectional view of the Fig. 5 ring as seen on line 6—6.

Referring to the drawings wherein like reference characters indicate like parts in the figures, there is shown in Fig. 1 a flexible shaft comprising, in general, a driving member 11 at one end, a driven member 12 at the other end, a telescoped tubing connection 13, and a pair of flexible diaphragm assemblies 14 and 15 for connecting the members 11 and 12 to the respective ends of the tubing connection 13.

The members 11 and 12 as illustrated are identical. Each has an internal-splined extension or a flange (not shown) adapted to be secured respectively to mating members of a driving shaft and driven shaft (not shown). These shafts in actual operation are of fixed or varying misalignment and subject to vibration. The assemblies 14 and 15 are normally flexed in operation to provide the torque-transmitting connection between the misaligned shafts. Covers 16 for the diaphragm assemblies are attached to the tubular connection 13 by screws 17 which appear only in the right assembly and serve to protect the diaphragms from external damage. Members 11 and 12 have circumferential flanges 21. One end of the diaphragm assemblies 14 and 15 is fastened at the peripheries of the outer diaphragms to the respective flanges 21 of the members 11 and 12 by means of bolts and nuts 23 which appear only in the left assembly.

A noteworthy feature of the present invention resides in the construction of the diaphragm plates or members and the means for assembling these members in order to give the flexible diaphragm assemblies 14 and 15. The diaphragms must be machined so that there is uniform torsional shear stress due to torque and uniform bending stress in the plane of flexure. To this end, annular diaphragm members 25 are made with a flat surface for ready attachment thereby to magnetic chucks whereby the surface opposite the flat surface can be contoured to give a diaphragm capable of being uniformly stressed under torsion and bending. The washer-like diaphragms are uniquely assembled in series by means of face splines on their inner contoured side and a clamping ring and by peripheral fasteners to give the diaphragm assemblies. This feature appears more clearly in Fig. 2 which is an enlarged view of the diaphragm assembly.

As seen in Figure 2, the diaphragm assemblies 14 and 15 are each comprised of a plurality of annular diaphragm members 25. Each steel diaphragm has a circumferential flange 26 of substantially uniform thickness and walls whose thickness decreases with increasing radial distance from the center so that uniform torsional shear stress due to torque is maintained throughout and substantially uniform bending stress occurs in the plane of flexure. The number of diaphragms used in an assembly may vary depending upon load and misalignment conditions. It is to be noted that one surface 28 of the diaphragm walls is entirely flat and terminates inwardly at inner edge 30 having perpendicular walls. The other surface 32 is profiled or contoured whereby the aforenoted decreasing thickness is achieved. The outer ends of the inner six diaphragms 25 are secured together by fastening the adjacent flanges 26 together with annular spacer rings by means of rivets 33 or other suitable means. The inner-diameter parts of the diaphragms are enlarged at the contoured wall side and are formed with wedge-shaped face splines 36. Engagement of these splines is effected by split clamp rings 40.

Rings 40 of spring steel normally have a diameter larger than the inner diameter of the diaphragms and have ends 41, 42 at the split in the ring. Rings 40 of U-shaped cross-section are compressed and fitted over the inner part of adjacent pairs of diaphragms 25 so that they exert a radially-outward force and an axially-spline-engaging force. As appears more clearly in Fig. 3, the rings are of U-shaped cross section with central part flexed and the uprights 43 exert opposed axial forces so that the slightly-inclined sides of splines 36 are urged together. It is to be noted that the axially-extending splines do not fully bottom in the mating recesses and give easy and accurate assembly of the diaphragms. The bottom part 44 of the U-shaped rings is flexed or sprung when clamping since normally the distance between the radially-outward-extending uprights or flanges of the rings are spaced closed together than the flat sides of mated diaphragms. Thus, the clamping action is obtained by flexing the center portion of the ring. It is to be noted that the flat, axially-extending and aligned annular surfaces at the inner diameter of the engaged diaphragms are perpendicular to the flat side walls 28 which are parallel to each other due to the face splines. With this construction, the two faces used for clamping are parallel and at right angles to the axis of the coupling. Thus, axial loads resulting from the transmission of torque through the face splines do not tend to close in the clamp ring radially. Since the clamp ring has an initial radial expansion force, any vibratory motion in the diaphragms will not force the ring in radially.

Referring again to Fig. 1, it can be seen that the last diaphragm 25 at the right of assembly 14 is attached by a bolt and nut 23 to a radially-extending flange 50 of a tubular driven element 51, forming a part of the tubular connection 13. Thus, torque is transmitted from driving member 11 through the outer-inner, serially-connected diaphragms 25 to tubular connection 13 for transmission therethrough to the right diaphragm assembly 15 and hence to driven member 12. The driven element 51 has a tubular extension 52 which is connected to the smaller inner tube 55 by torque limiting disc pack 57 having interlayered discs alternately fixed to the driven member and the inner tube, respectively. The discs are biased axially together by Belleville springs 58 which are held in adjusted relation to the discs by a ring nut 59 screw-threaded into the open end of the tubular extension 52. The disc plates have cast iron bearing rings 60 at each end and the assembly is urged against a transverse wall 61 of driven element 51. The inner tube 55 is connected to the larger outer tube 63 by means of a spline connection 64. It is to be noted that the outwardly protruding part 65 of the spline connection is short and fits into a long spline receiving channel 66 in the outer tube. The lock ring 67 and seal 68 prevents the separation of the inner and outer tubes so that other tubes are not freely interchanged. The long splined groove of outer tube permits the short splined inner tube 55 to slide axially therein to allow for variations in the distance between the driving and driven numbers 11 and 12. The outer tube 63 extends to the other flexible disc pack 15 and provides the driving element or annulus 71 for connection to the first disc of assembly 15. Referring to the structure at the left end of the inner tube 55, it can be seen that the tubular bearing retainer 73 which is threaded into the driven element 51 extends axially to a grease cap 75 to provide a grease cup. Retainer 73 also has a shoulder 76 and a perforated plate is mounted on the shoulder 77. It is apparent that the construction at the right end of the shaft is identical with the construction at the left end except for the clutch 57 and the slight differences between driven element 51 and driving element 71.

In order to provide for greater rigidity of the complete coupling as well as to provide safety in the case of a failure of one of the diaphragms 25, the driving member 11 and tubular driven element 51 are connected by means of knuckle joints 81, arranged in the following manner, as indicated in detail at the left of Fig. 1. A spherical ball 82 is locked in place on an axially extending threaded portion 83 of the driving member 11 by means of a nut 84. The ball 82 is seated in spherical bushings 85 which are positioned in a bearing housing 86 by means of a bearing retainer 73 which also provides the aforenoted grease cup. The bearing housing 86 is an axially extending tubular portion of driven element and extends to the left from the inner part of transverse wall 61. In normal operation, the knuckle joint 81 provides a center of articulation about which the diaphragm pack deflects. This joint also takes any lateral loads developed in the joint, allowing the diaphragms to transmit torque only. However, if a failure occurs in one of the diaphragms, the member 11 via ball 82 would rotate in the bushings 85 and driving member 11 and driven member 51 would remain safely connected.

It is to be noted that shoulder 88 of bearing housing 86 is so arranged in relation to extension 83 that only a limited angular deflection of the driven element 51 in relation to the axis of the driving member 11 is possible. Shoulder 88 will abut the base of the shaft extension 83 of member 11 after limited deflection. This maximum deflection is seven and one-half degrees or the maximum safe temporary deflection of the disclosed embodiment. This arrangement also prevents the diaphragm assembly from being damaged during assembly or repair by over-flexing.

Referring to Fig. 4, it can be seen that a modification for the split clamp ring 40 (previously described) is shown. This modification consists of a split backing spring 91 which urges the clamp ring 40 radially outward. The spring-steel, backing ring 91 normally has a diameter larger than the inside diameter of the clamp ring 40 and is compressed into position. The nested-in backing spring 91 augments the outwardly radial force which is exerted by the clamp ring 40 on the adjacent pair of diaphragms.

In Figures 5 and 6, a modification of the clamp means is shown. This clamp ring 93 has the same U-shaped cross-section as the previously-described clamp rings so that the flexed center part of ring exerts an axial force against the flat sides of the discs and hence prevents separation at the face splines 36. Clamp ring 93 differs from clamp ring 40 in that ring 93 has a diameter which is smaller than the inside diameter of the discs 25. Thus, it is necessary to expand clamp ring 93 in order for its uprights or flanges 43 to expand over and bear against the flat sides of the disc. This arrangement is maintained by means of a key 94 which is retained between ends of the split ring by means of the slot and key connection 95. The cross-section of the key is rectangular. Key 95 expands ring 93 radially outward and provides a radially outward force and result which is similar to the result obtained by spring 40.

In operation, torque is transmitted from the driven member 11 through the flexed serially-connected diaphragms 25 to the driven element 52. The torque limiting disc pack normally permits the torque to be transmitted to inner tube 55, the spline connection 64 and to the tubular driven element 63. The torque then is transmitted through the flexed diaphragm assembly 15 to the driven member 12. If there is an exceptionally large torque transmitted or a restraint on driven member 12, the torque limiting clutch 57 will function by the interlayered leaves sliding over each other and hence prevent damage to the flexible drive shaft or the connected devices. The knuckle joints 81 provide greater rigidity for the complete coupling without adversely affecting any of its flexible characteristics. If one of the diaphragms 25 fails, the driving member 11 or the driving element 63 will merely rotate around the balance of the knuckle joint, thus preventing damage since the shaft will be retained by the joint.

With above-described construction, it is apparent that the contoured surface of the diaphragms can be made by conveniently holding the diaphragms with their flat faces against a magnetic chuck. The diaphragms can be easily assembled by aligning the axially-extending wedge-shaped teeth which do not fully bottom and which have slightly-inclined side faces and then rigidly clamping the diaphragms together. The clamping rings effectively prevent axial separation of the diaphragms via teeth or splines and also opposes any radially inward force tending to push the clamp ring off the diaphragms. The resulting lower-cost flexible drive shaft provides for the transmission of high torques, high speeds and high deflections. One unit is designed for sixty horse power, a five degree per joint deflection during continuous operation and up to ten thousand r.p.m.

While the flexible coupling has been designated as having a driving member and a driven member, it can readily be seen that it is immaterial as to which is the driving or driven end.

Although specific embodiments of the invention have been illustrated and described, it is apparent that various changes can be made by persons skilled in the art without departing from the invention as set forth in the following claims:

What is claimed is:

1. In a flexible drive shaft having a driven element and a driving member, the improvement comprised of a diaphragm assembly connecting said element and said member, said diaphragm assembly including a plurality of pairs of annular diaphragms, each of said diaphragms having a flat side face and a contoured side face, each of said diaphragms having side face splines at the inner part of the contoured side thereof, each pair of said diaphragms having their contoured side faces facing each other and their side face splines engaged whereby two parallel flat side faces are provided, the end pairs of said diaphragms having their outer flat faces respectively facing said driving member and said driven element and being attached at their outer peripheries to said member and said element, adjacent diaphragms of said pairs of said diaphragms being connected at their peripheries, and means clamping each of said pairs of diaphragms together at said splines.

2. In a flexible drive shaft having a driven element and a driving member, the improvement comprised of a diaphragm assembly connecting said element and said member, said diaphragm assembly including a plurality of pairs of annular diaphragms, each of said diaphragms having a flat side face and a contoured side face, each of said diaphragms having side face splines at the inner part of the contoured side thereof, each pair of said diaphragms having their contoured side faces facing each other and their side face splines engaged whereby two parallel flat side faces are provided, the end pairs of said diaphragms having their outer flat faces respectively facing said driving member and said driven element and being attached at their outer peripheries to said member and said element, adjacent diaphragms of said pairs of said diaphragms being connected at their peripheries, means clamping each of said pairs of diaphragms together at said splines, said means being an annular ring of U-shaped cross section, and said ring means being flexed at the center of said U-shaped cross section to provide an axial force against the flat sides of said pairs of diaphragms.

3. In a flexible drive shaft having a driven element and a driving member, the improvement comprised of a diaphragm assembly connecting said element and said member, said diaphragm assembly including a plurality of pairs of annular diaphragms, each of said diaphragms having a flat side face and a contoured side face, each of said diaphragms having side face splines at the inner part of the contoured side thereof, each pair of said diaphragms having their contoured side faces facing each other and their side face splines engaged whereby two parallel flat side faces are provided, the end pairs of said daiphragms having their outer flat faces respectively facing said driving member and said driven element and being attached at their outer peripheries to said member and said element, adjacent diaphragms of said pairs of said diaphragms being connected at their peripheries, ring means clamping each of said pairs of diaphragms together at said splines, said ring means being an annular ring of U-shaped cross section, said ring being flexed at the center of said U-shaped cross section to provide an axial force against the flat sides of said pairs of diaphragms, and said annular ring being compressed into position.

4. The flexible drive shaft according to claim 3 and further characterized by said annular ring having a backing spring of ring shape urging said ring radially outwardly.

5. In a flexible drive shaft having a driven element and a driving member, the improvement comprised of a diaphragm assembly connecting said element and said member, said diaphragm assembly including a plurality of pairs of annular diaphragms, each of said diaphragms having a flat side face and a contoured side face, each of said diaphragms having side face splines at the inner part of the contoured side thereof and flat annular surface at its inside diameter, each pair of said diaphragms having their contoured side faces facing each other and their side face splines engaged whereby two parallel flat side faces are provided, the end pairs of said diaphragms having their outer flat faces respectively facing said driving member and said driven element and being attached at their outer peripheries to said member and said element, adjacent diaphragms of said pairs of said diaphragms being connected at their peripheries, and means clamping each of said pairs of diaphragms together at said splines, said means being annular ring of U-shaped cross-section which is flexed at the center part of the U-shaped cross-section and expanded into contact with said pairs of diaphragms by having a key between the ends of the split ring which is locked in position whereby said flexed and expanded U-shaped ring urges said splines together and exerts a radially-outward force against said flat annular surfaces of said pairs of diaphragms.

6. A diaphragm assembly comprised of plurality of axially-aligned pairs of annular diaphragms, each of said diaphragms having a flat side face and a contoured side face, each of said diaphragms having side face splines at the inner part of the contoured side thereof, each pair of said diaphragms having their contoured side faces facing each other and their side face splines engaged whereby two parallel flat side faces are provided, adjacent diaphragms of said pairs of said diaphragms being connected at their peripheries, and ring means clamping each of said pairs of diaphragms together at said splines.

7. A flexible drive shaft comprised of a drive member having an annular drive flange, a tubular driven element having an annular driven flange, said drive and driven flanges being connected by a first diaphragm assembly having serially-connected diaphragms, said tubular driven member being connected by a torque limiting disc pack to a second tubular member positioned within said tubular driven member, said second tubular member being connected to a tubular drive element by means of an elongated spline connection, said tubular drive element having annular drive flange conected to a driven member by a second diaphragm assembly.

8. A flexible coupling for the transmission of torque comprising a driving member having an annular driving flange, pairs of annular discs serially connected by separable attachments at their inner and outer edges, means connecting one of the outer two discs at its outer edge to said annular driving flange, a driven element having a substantially annular driven flange, means connecting the other of the outer two discs at its outer edge to said driven annular flange, means including a knuckle joint supporting said driven element from said driving member at the location of said discs, said knuckle joint having one portion secured to said driving member and another portion secured to a transverse wall of said driven element, said driven element having a tubular extension axially projecting from said driven flange, and a tube for transmitting torque from said driven element positioned within said tubular extension and connected thereto by a torque limiting disc pack which is biased against said transverse wall of said driven element.

9. A flexible coupling for the transmission of torque comprising a driving member, a driven element, a flexible diaphragm assembly connecting said driving and driven members, a knuckle joint supporting and preventing axial movement of said driven element relative to said driving member at the location of said diaphragm assembly, said knuckle joint including an axially-extending shaft which is integral with said driving member and carries a ball and a tubular extension of said driven element which confines bearings for said ball and terminates in an inwardly-extending flange, said flange and the base of said shaft being arranged to limit the deflection of said diaphragm assembly to a predetermined safe deflection.

References Cited in the file of this patent

UNITED STATES PATENTS

| | | |
|---|---|---|
| 2,647,380 | Troeger et al. | Aug. 4, 1953 |
| 2,712,741 | Roller | July 12, 1955 |
| 2,790,312 | Hagenlocher | Apr. 30, 1957 |